United States Patent
Chen

(10) Patent No.: US 9,134,894 B2
(45) Date of Patent: Sep. 15, 2015

(54) ELECTRONIC DEVICE, STORAGE MEDIUM AND METHOD FOR SELECTING OBJECTS OF THE ELECTRONIC DEVICE

(75) Inventor: Yu-Chun Chen, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 311 days.

(21) Appl. No.: 13/533,985

(22) Filed: Jun. 27, 2012

(65) Prior Publication Data

US 2013/0181914 A1   Jul. 18, 2013

(30) Foreign Application Priority Data

Jan. 12, 2012  (TW) .............................. 101101305 A

(51) Int. Cl.
   *G06F 3/0488* (2013.01)
   *G06F 3/0484* (2013.01)

(52) U.S. Cl.
   CPC .......... *G06F 3/0488* (2013.01); *G06F 3/04842* (2013.01); *G06F 2203/04808* (2013.01)

(58) Field of Classification Search
   CPC ............................................. G06F 2203/04808
   USPC .................................. 345/660, 650, 661, 173
   See application file for complete search history.

(56) References Cited

U.S. PATENT DOCUMENTS

| | | | |
|---|---|---|---|
| 6,498,590 B1 * | 12/2002 | Dietz et al. | 343/893 |
| 2009/0282332 A1 * | 11/2009 | Porat | 715/702 |
| 2011/0181528 A1 * | 7/2011 | Capela et al. | 345/173 |

* cited by examiner

*Primary Examiner* — Amare Mengistu
*Assistant Examiner* — Shawna Steep Jones
(74) *Attorney, Agent, or Firm* — Novak Druce Connolly Bove + Quigg LLP

(57) ABSTRACT

In a method for selecting objects of an electronic device, a touch operation performed on a touch screen of the electronic device is detected. A selection region on the touch screen is determined according to a touch operation that is detected from the touch screen. The selection region is scaled according to one or more predetermined ratios when contact points of the touch operation move on the touch screen. Objects displayed on the touch screen are selected according to the determined selection region.

15 Claims, 5 Drawing Sheets

ELECTRONIC DEVICE, STORAGE MEDIUM
AND METHOD FOR SELECTING OBJECTS
OF THE ELECTRONIC DEVICE

BACKGROUND

1. Technical Field

Embodiments of the present disclosure relate to data processing devices and methods, and more particularly to an electronic device, a storage medium, and a method for selecting objects of the electronic device.

2. Description of Related Art

Electronic devices, such as smart mobile phones, personal digital assistants, and tablet computers, are widely used. The electronic devices may display objects, such as folders, pictures, and icons of applications using touch screens. In general, users select the objects by performing touch operations with fingers or styluses on the touch screens. However, the users have to select the objects one by one, or select all of the objects via a "select all" option. It is inconvenient for users if the users just want to select a part of the objects.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable storage medium or other storage device. Some non-limiting examples of non-transitory computer-readable storage medium include CDs, DVDs, BLU-RAY, flash memory, and hard disk drives.

Figure 1:
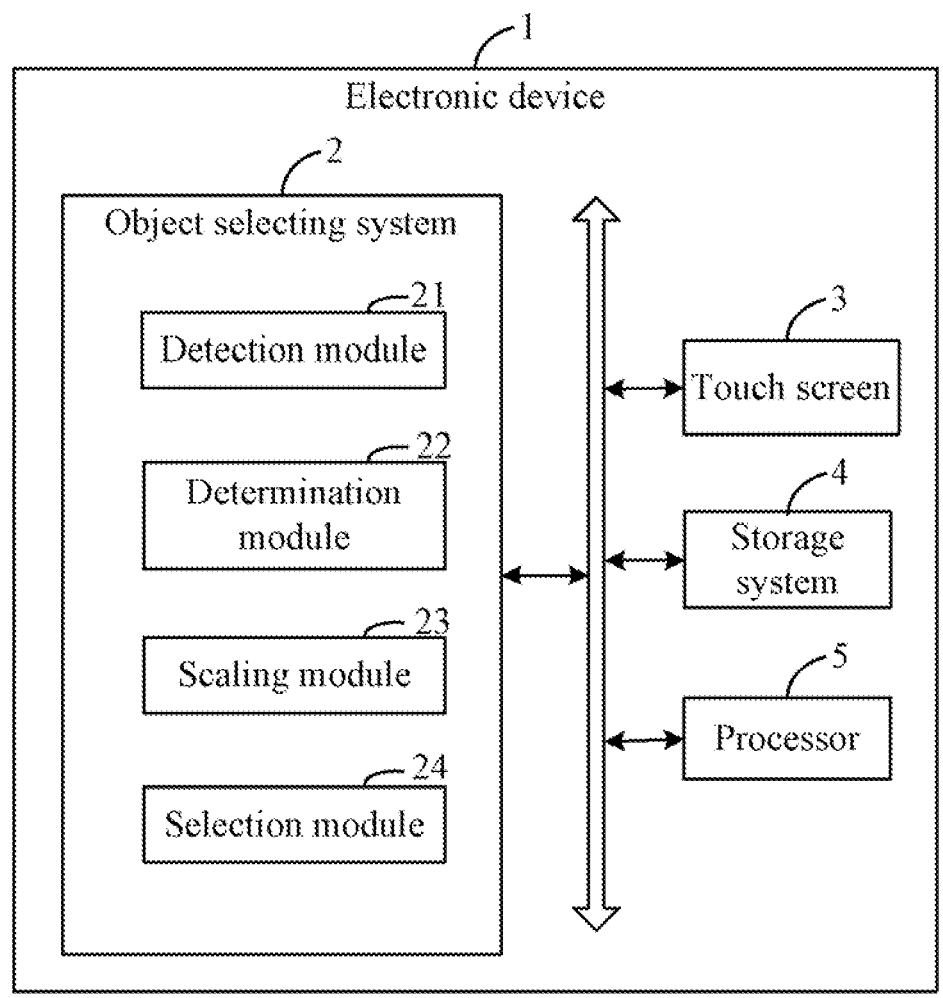
FIG. 1 is a block diagram of one embodiment of an electronic device including an object selecting system.
Figure 2:
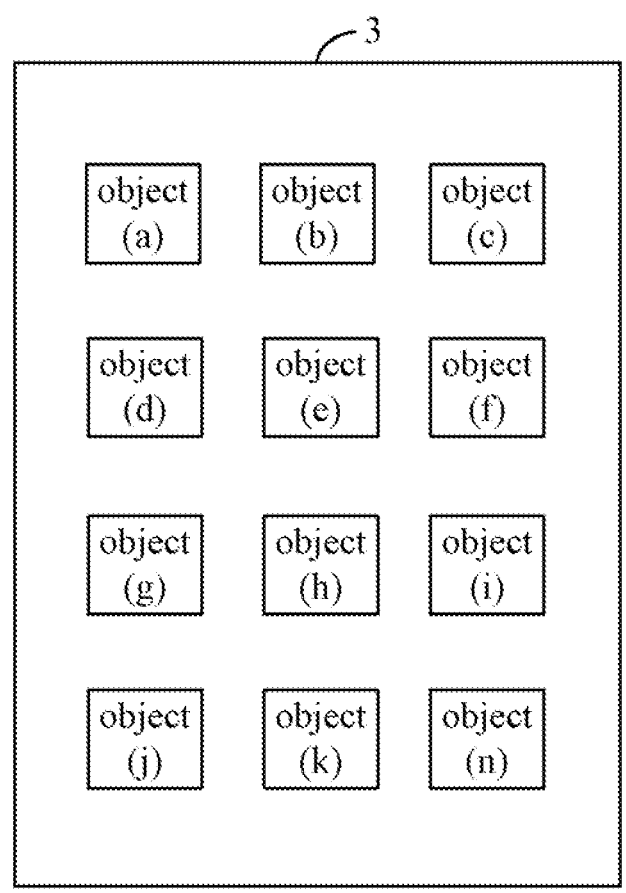
FIG. 2 is a schematic diagram of objects displayed on a touch screen of the electronic device of FIG. 1.

FIG. 1 is a block diagram of one embodiment of an electronic device 1 including an object selecting system 2. In the embodiment, the electronic device 1 further includes a touch screen 3 that may be capacitive or resistive, a storage system 4, and at least one processor 5. The touch screen 3 can display several objects of the electronic device 1, such as folders, pictures, and icons of applications. In one example, as shown in FIG. 2, the touch screen 3 displays twelve objects: object (a), object (b), . . . , and object (n). The electronic device 1 may be, for example, a mobile phone, a personal digital assistant, a handheld game console or a tablet computer. FIG. 1 is just one example of the electronic device 1 that can be included with more or fewer components than shown in other embodiments, or have a different configuration of the various components.

The object selecting system 2 may be in form of one or more programs that are stored in the storage system 4 and executed by the at least one processor 5. The object selecting system 2 can detect touch operations performed on the touch screen 3, and select the objects displayed on the touch screen 3 according to the detected touch operations. In the embodiment, the touch operations refer to the presence of one or more contact points of contacts (e.g., fingers or styluses), and any movement or break of the contacts that are simultaneously sensed by the touch screen 3.

In one embodiment, the storage system 4 may be a random access memory (RAM) for temporary storage of information, and/or a read only memory (ROM) for permanent storage of information. In other embodiments, the storage system 4 may also be an external storage device, such as a hard disk, a storage card or a data storage medium. The at least one processor 5 executes computerized operations of the electronic device 1 and other applications to provide functions of the electronic device 1.

In the embodiment, the object selecting system 2 may include a detection module 21, a determination module 22, a scaling module 23, and a selection module 24. The modules 21-24 may comprise a plurality of functional modules each comprising one or more programs or computerized codes that are stored in the storage system 4, and can be accessed and executed by the at least one processor 5.

Figure 3:
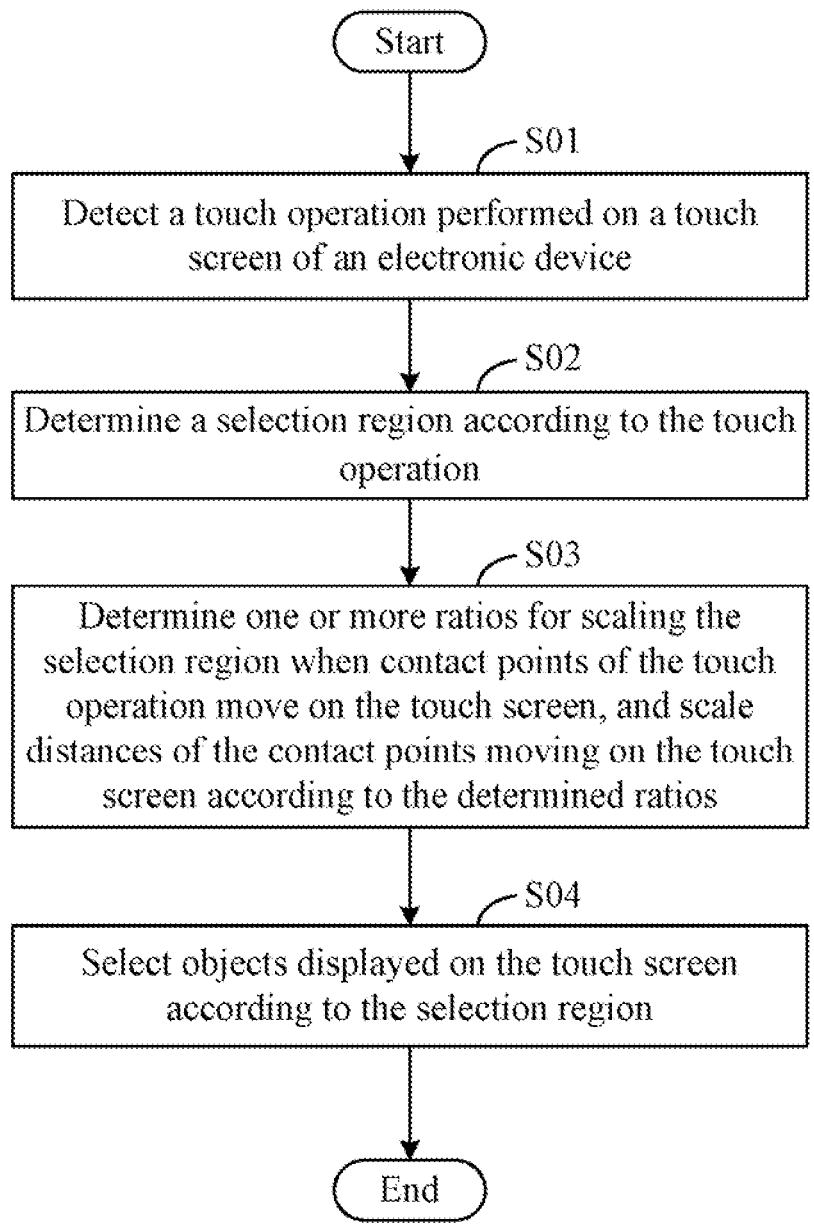
FIG. 3 is a flowchart of one embodiment of a method for selecting objects of the electronic device of FIG. 1.

FIG. 3 is a flowchart of one embodiment of a method for selecting objects of the electronic device 1 of FIG. 1. Depending on the embodiment, additional steps may be added, others removed, and the ordering of the steps may be changed.

Figure 4:
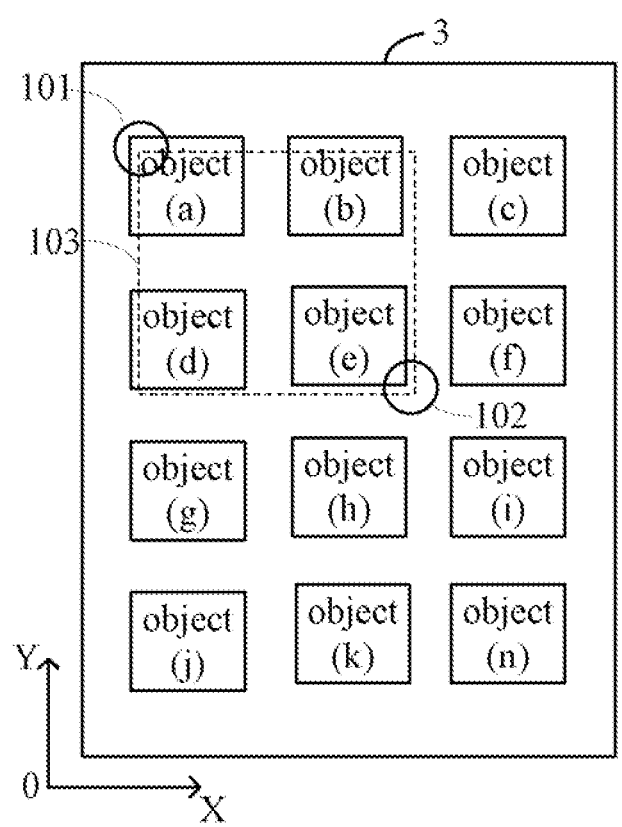
FIGS. 4-5 are schematic diagrams of embodiments of methods for determining selection regions on the touch screen of the electronic device of FIG. 1.

In step S01, the detection module 21 detects a touch operation performed on the touch screen 3. In the embodiment, the touch operation refers to the presence of one or more contact points of contacts, and any movement or break of the contacts that are simultaneously sensed by the touch screen 3. The detection module 21 further determines positions of the one or more contact points on the touch screen 3. For example, a touch operation may include two contact points on the touch screen 3. As shown in FIG. 4, the two contact points on the touch screen 3 are a contact point 101 and a contact point 102. If the touch screen 3 is placed in a coordinate system, a direction of can be a width side of the touch screen 3 is an X-axis of the coordinate system, and a direction of a length side of the touch screen 3 can be a Y-axis of the coordinate system. The detection module 21 determines a coordinate value of a position of the contact point 101 in the coordinate system as (x1, y1), and determines a coordinate value of a position of the contact point 102 in the coordinate system as (x2, y2).

In step S02, the determination module 22 determines a selection region on the touch screen 3 according to positions of one or more contact points of the touch operation that is detected from the touch screen 3. The selection region is defined as a polygon region, such as a rectangle region, a triangle region, or other irregular polygon region, that is determined according to the positions of the one or more contacts points of the touch operation. For example, the determination module 202 determines a rectangle selection region 103 as shown in FIG. 4 on the touch screen 3 according to the touch operation with the contact point 101 and the contact point 102 of the touch screen 3. A diagonal of the rectangle selection region 103 connects to the two contact points that are two vertices of the rectangle selection region 103. In addition, four sides of the rectangle selection region 103 are correspondingly parallel with four boundaries of the touch screen 3.

In step S03, the scaling module 23 determines one or more ratios for scaling the selection region when the contact points of the touch operation move in random directions on the touch screen 3, and scales distances of the contact points moving on the touch screen 3 according to the determined ratios. In one embodiment, if an area of the touch screen 3 is so large that a user cannot perform a touch operation to determine a large enough selection region on the touch screen 3, the user can expand the selection region by moving the contact points of the touch operation on the touch screen 3.

In one embodiment, the one or more ratios can be determined according to one of the following rules: (1) determining a ratio for the contact points of the touch operation as a fixed value, such as two. (2) determining a ratio for the contact points of the touch operation according to length of figures of the user. For example, the user can stretch the figures of his/her hand to perform a touch operation on the touch screen 3 for determining a sample region as large as possible. The method of determining the sample region is the same as the method of determining the selection region. The ratio can be determined as a ratio of a length of the touch screen 3 to a length of the sample region. The ratio also can be determined as a ratio of a width of the touch screen 3 to a width of the sample region. (3) determining a ratio for the contact points of the touch operation according to a time duration of the contact points moving on the touch screen 3. For example, the scaling module 23 determines the ratio as two during the first 0.3 seconds while the contact points are moving on the touch screen 3. Then the scaling module 23 determines the ratio as three after the first 0.3 seconds while the contact points are moving on the touch screen 3. (4) determining a ratio for each contact point according to moving velocity of the each contact point on the touch screen 3. For example, the scaling module 23 predetermines an average velocity of the contact points on the touch screen 3, and determines a ratio of a contact point as a ratio of the moving velocity of the contact point to the average velocity. If the moving velocity of the contact point is greater, the ratio is greater. If the moving velocity of the contact point is lower, the ratio is lower.

Figure 5:
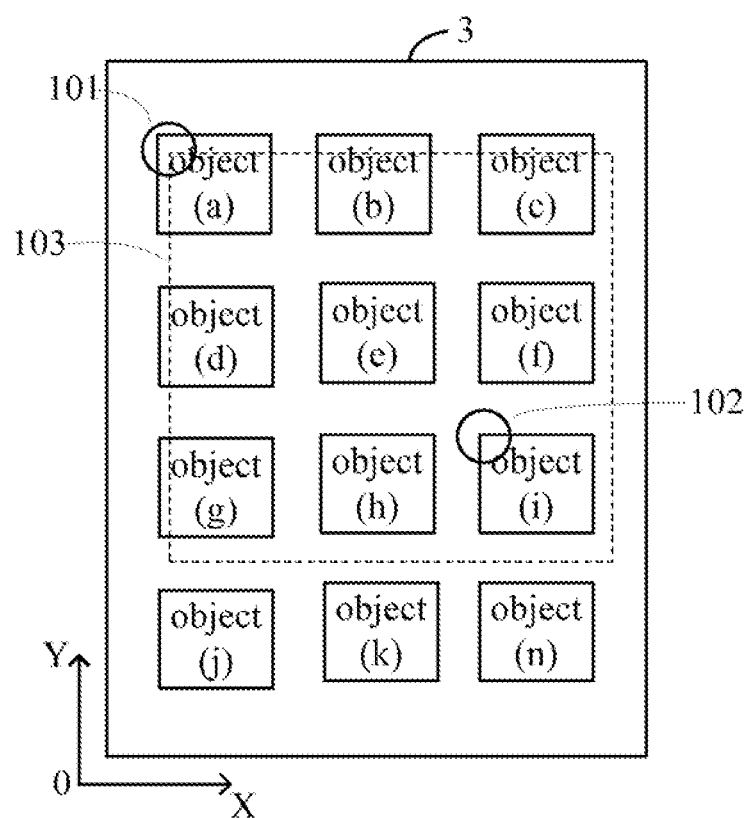

In one example, referring to FIG. 5, the contact point 101 does not move on the touch screen 3, but the contact point 102 moves on the touch screen 3. The scaling module 23 determines a ratio for the contact point 102 of the touch operation. If a distance of the contact point 102 moving towards the X-axis direction is "dx", and a distance of the contact point 102 moving towards the Y-axis direction is "dy", the coordinate value of the position of the contact point 102 in the coordinate system becomes (x2+dx, y2+dy). A coordinate value of a vertex of the rectangle selection region 103 corresponding to the contact point 102 becomes (x2+determined ratio*dx, y2+determined ratio*dy) after the rectangle selection region 103 is scaled according to the determined ratio, such as the rectangle selection region 103 shown in the FIG. 5.

In another example, if both the contact point 101 and the contact point 102 move on the touch screen 3, the scaling module 23 also can determine a first ratio for the contact point 101, and determine a second ratio for the contact point 102. The scaling module 23 scales the distance of the contact point 101 moving on the touch screen 3 according to the first ratio, and scales the distance of the contact point 102 moving on the touch screen 3 according to the second ratio, so as to scale the rectangle selection region 103.

In step S04, the selection module 24 selects the objects displayed on the touch screen 3 according to the determined selection region. In one embodiment, the selection module 24 selects the objects located in the selection region. As shown in FIG. 5, the selection module 24 selects the object (e), object (f), object (h), and object (i) that are located in the selection region 103. In another embodiment, the selection module 24 selects the objects whose locations are overlapping with the selection region. As shown in FIG. 5, the selection module 24 selects the object (a), object (b), object (c), object (d), object (e), object (f), object (g), object (h), and object (i) whose location are overlapping with the rectangle selection region 103.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
   a touch screen;
   a detection module that detects a touch operation performed on the touch screen, the touch operation comprising two contacts on two contact points of the touch screen;
   a determination module that determines a selection region on the touch screen according to the touch operation, the selection region being defined as a polygon region, the two contact points being two vertices of the polygon and a line formed by the two contact points being a diagonal of the polygon region;
   a selection module that selects one or more objects displayed on the touch screen according to the determined selection region; and
   a scaling module that scales the selection region when at least one of the contact points moves on the touch screen, wherein the selection region is scaled by moving at least one of the vertexes corresponding to the at least one moving contact point and a moving distance of the corresponding vertex is calculated by multiplying a moving distance of the at least one moving contact point by a determined ratio, wherein the determined ratio is determined according to one of the following rules:
   (1) determining the determined ratio according to a ratio of a length of the touch screen to a length of a sample region or a ratio of a width of the touch screen to a width of the sample region, wherein the sample region is smaller than the touch screen;
   (2) determining the determined ratio as a first value before a predetermined time moment while the at least one of the contact points is moving on the touch screen and determining the determined ratio as a second value after the predetermined time moment while the at least one of the contact points is moving on the touch screen, wherein the first value and the second value are different; and
   (3) determining the determined ratio according to a ratio of a moving velocity of the at least one of the contact points to a predetermined average velocity of the contact points of the touch operation on the touch screen.

2. The electronic device of claim 1, wherein the determination module determines a rectangle selection region on the touch screen when the two contact points of the touch screen are detected.

3. The electronic device of claim 2, wherein the rectangle selection region comprises a diagonal that connects to the two contact points that are two vertices of the rectangle selection region, and four sides that correspondingly parallel with four boundaries of the touch screen.

4. The electronic device of claim 1, wherein the scaling module scales the selection region by moving the two vertices when both of the contact points move on the touch screen, the scaling module calculates a moving distance of the first vertex corresponding to the first contact point by multiplying a moving distance of the first contact point by a first ratio, and calculates a moving distance of the second vertex corresponding to the second contact point by multiplying a moving distance of the second contact point by a second ratio, wherein the first ratio and the second ratio are different.

5. The electronic device of claim 1, wherein the selection module further selects the objects located in the selection region and the objects partially overlapping with the selection region.

6. A method for enabling selection of objects displayed on an electronic device, the method comprising:
 (a) detecting a touch operation performed on a touch screen of the electronic device, the touch operation comprising two contacts on two contact points of the touch screen;
 (b) determining a selection region on the touch screen according to the touch operation, the selection region being defined as a polygon region, the two contact points being two vertices of the polygon and a line formed by the two contact points being a diagonal of the polygon region;
 (c) selecting one or more objects displayed on the touch screen according to the determined selection region; and
 (d) scaling the selection region when at least one of the contact points moves on the touch screen, wherein the selection region is scaled by moving at least one of the vertexes corresponding to the at least one moving contact point and a moving distance of the corresponding vertex is calculated by multiplying a moving distance of the at least one moving contact point by a determined ratio, wherein the determined ratio is determined according to one of the following rules:
  (1) determining the determined ratio according to a ratio of a length of the touch screen to a length of a sample region or a ratio of a width of the touch screen to a width of the sample region, wherein the sample region is smaller than the touch screen;
  (2) determining the determined ratio as a first value before a predetermined time moment while the at least one of the contact points is moving on the touch screen and determining the determined ratio as a second value after the predetermined time moment while the at least one of the contact points is moving on the touch screen, wherein the first value and the second value are different; and
  (3) determining the determined ratio according to a ratio of a moving velocity of the at least one of the contact points to a predetermined average velocity of the contact points of the touch operation on the touch screen.

7. The method of claim 6, further comprising:
 determining a rectangle selection region on the touch screen when the two contact points of the touch screen are detected.

8. The method of claim 7, wherein the rectangle selection region comprises a diagonal that connects to the two contact points that are two vertices of the rectangle selection region, and four sides that correspondingly parallel with four boundaries of the touch screen.

9. The method of claim 6, wherein the step (d) further comprises:
 scaling the selection region by moving the two vertices when both of the contact points move on the touch screen;
 calculating a moving distance of the first vertex corresponding to the first contact point by multiplying a moving distance of the first contact point by a first ratio; and
 calculating a moving distance of the second vertex corresponding to the second contact point by multiplying a moving distance of the second contact point by a second ratio, wherein the first ratio and the second ratio are different.

10. The method of claim 6, wherein the step (c) further comprises:
 selecting the objects located in the selection region and the objects partially overlapping with the selection region.

11. A non-transitory storage medium storing a set of instructions, the set of instructions being executed by a processor of an electronic device to cause the processor to:
 (a) detect a touch operation performed on a touch screen of the electronic device, the touch operation comprising two contacts on two contact points of the touch screen;
 (b) determine a selection region on the touch screen according to the touch operation, the selection region being defined as a polygon region, the two contact points being two vertices of the polygon and a line formed by the two contact points being a diagonal of the polygon region;
 (c) select one or more objects displayed on the touch screen according to the determined selection region; and
 (d) scale the selection region when at least one of the contact points moves on the touch screen, wherein the selection region is scaled by moving at least one of the vertexes corresponding to the at least one moving contact point and a moving distance of the corresponding vertex is calculated by multiplying a moving distance of the at least one moving contact point by a determined ratio, wherein the determined ratio is determined according to one of the following rules:
  (1) determining the determined ratio according to a ratio of a length of the touch screen to a length of a sample region or a ratio of a width of the touch screen to a width of the sample region, wherein the sample region is smaller than the touch screen;
  (2) determining the determined ratio as a first value before a predetermined time moment while the at least one of the contact points is moving on the touch screen and determining the determined ratio as a second value after the predetermined time moment while the at least one of the contact points is moving on the touch screen, wherein the first value and the second value are different; and
  (3) determining the determined ratio according to a ratio of a moving velocity of the at least one of the contact points to a predetermined average velocity of the contact points of the touch operation on the touch screen.

12. The storage medium of claim 11, wherein the storage medium stores further instructions that, when executed by the processor, cause the processor to:
 determine a rectangle selection region on the touch screen when the two contact points of the touch screen are detected.

13. The storage medium of claim 12, wherein the rectangle selection region comprises a diagonal that connects to the two contact points that are two vertices of the rectangle selection region, and four sides that correspondingly parallel with four boundaries of the touch screen.

14. The storage medium of claim 11, wherein the step (d) further comprises:
- scaling the selection region by moving the two vertices when both of the contact points move on the touch screen;
- calculating a moving distance of the first vertex corresponding to the first contact point by multiplying a moving distance of the first contact point by a first ratio; and
- calculating a moving distance of the second vertex corresponding to the second contact point by multiplying a moving distance of the second contact point by a second ratio, wherein the first ratio and the second ratio are different.

15. The storage medium of claim 11, wherein the step (c) further comprises:
- selecting the objects located in the selection region and the objects partially overlapping with the selection region.

* * * * *